(12) United States Patent
Siddiqui et al.

(10) Patent No.: US 8,208,045 B2
(45) Date of Patent: Jun. 26, 2012

(54) METHOD AND SYSTEM FOR REDUCING NOISE IN IMAGE DATA

(75) Inventors: Muhammad Siddiqui, Stuttgart (DE); Klaus Zimmermann, Deizisau (DE)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/511,596

(22) Filed: Jul. 29, 2009

(65) Prior Publication Data

US 2010/0073522 A1 Mar. 25, 2010

(30) Foreign Application Priority Data

Sep. 25, 2008 (EP) .................................. 08165150

(51) Int. Cl.
*H04N 5/217* (2006.01)
*H04N 9/64* (2006.01)
*H04N 5/202* (2006.01)
*G06K 9/40* (2006.01)

(52) U.S. Cl. ......... 348/242; 348/241; 348/254; 382/275

(58) Field of Classification Search ............... 348/216.1, 348/222.1, 241–2, 254–256; 382/275; 358/519
See application file for complete search history.

(56) References Cited

U.S. PATENT DOCUMENTS

| | | | | |
|---|---|---|---|---|
| 7,102,669 | B2 * | 9/2006 | Skow | 348/222.1 |
| 7,847,838 | B2 * | 12/2010 | Ooishi | 348/241 |
| 2003/0076988 | A1 * | 4/2003 | Liang et al. | 382/131 |
| 2003/0142876 | A1 | 7/2003 | Sugimoto et al. | |
| 2004/0246350 | A1 | 12/2004 | Sakamoto | |
| 2005/0185071 | A1 * | 8/2005 | Takahashi et al. | 348/254 |
| 2005/0259889 | A1 | 11/2005 | Ferrari et al. | |
| 2007/0147697 | A1 * | 6/2007 | Lee et al. | 382/260 |
| 2008/0303920 | A1 * | 12/2008 | Kinoshita | 348/226.1 |

FOREIGN PATENT DOCUMENTS

| | | |
|---|---|---|
| JP | 2008-142421 | 6/2006 |
| WO | WO 2005/017831 A2 | 2/2005 |
| WO | WO 2005017831 A2 * | 2/2005 |

OTHER PUBLICATIONS

Summons to attend oral proceedings issued Apr. 19, 2011 in Europe Application No. 08165150.7.
J.L. Starck et al., "Multispectral data restoration by the wavelet Karhunen-Loeve transform", Signal Processing, Elsevier Science Publishers, vol. 81, No. 12, Dec. 1, 2001, XP004324104, ISSN: 0165-1684, pp. 2449-2459.
J. Starck et al., Image Processing and Data Analysis, 5 pages.
Michael Stokes et al., "A Standard Default Color Space for the Internet-sRGB", Version 1.10, Nov. 5, 1996, http://www.w3.org/Graphics/Color/sRGB, 16 pages.
sRGB, http://en.wikipedia.org/wiki/SRGB_color_space, 6 pages.
Office Action issued Oct. 15, 2010 in EP Application No. 08165150.7.

* cited by examiner

*Primary Examiner* — Daniel M Pasiewicz
(74) *Attorney, Agent, or Firm* — Oblon, Spivak, McClelland, Maier & Neustadt, L.L.P.

(57) ABSTRACT

The present invention relates to a method for reducing noise in image data, comprising the steps of performing (S4, S7, S10) a spatial noise reduction on the image data and applying (S12) a gamma correction on the spatial noise reduced image data.
The present invention further relates to a system for noise reduction in image data.

11 Claims, 3 Drawing Sheets

Figure 4:
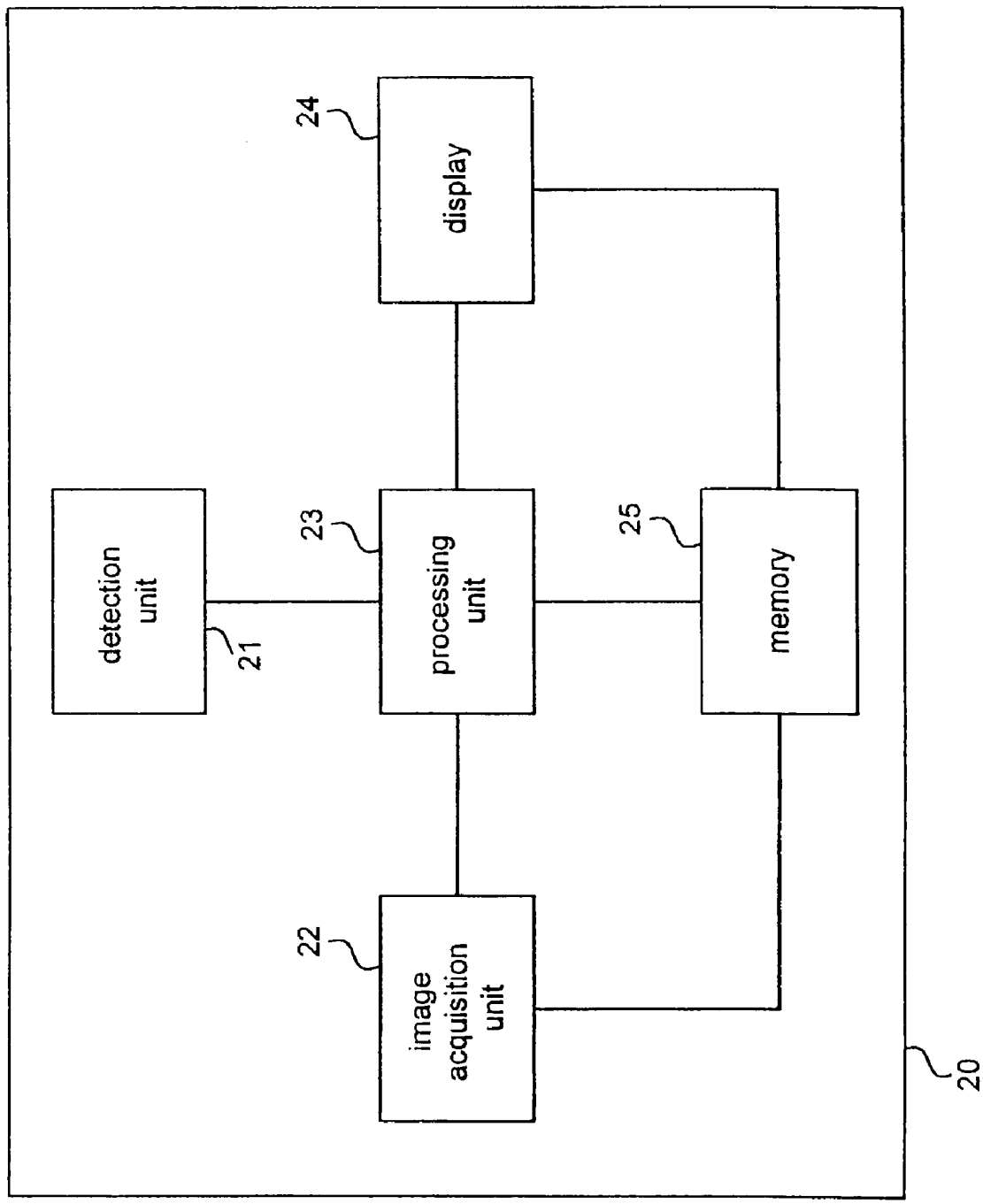

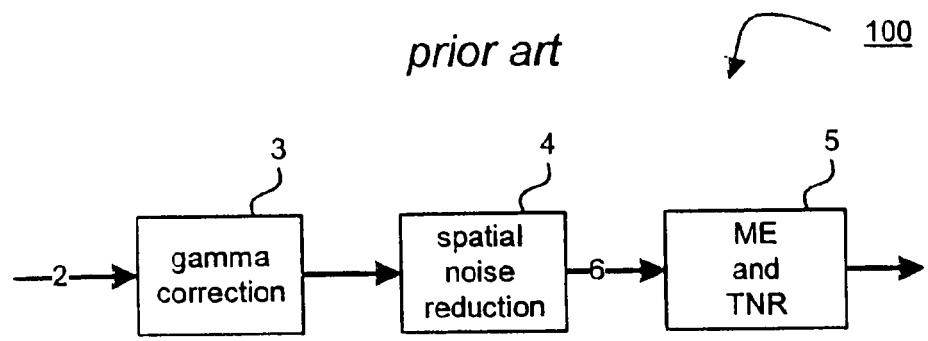
Fig. 1 *prior art*
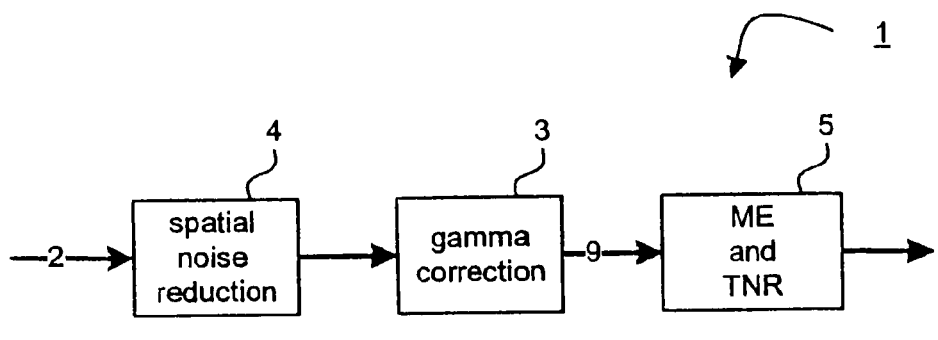
Fig. 2
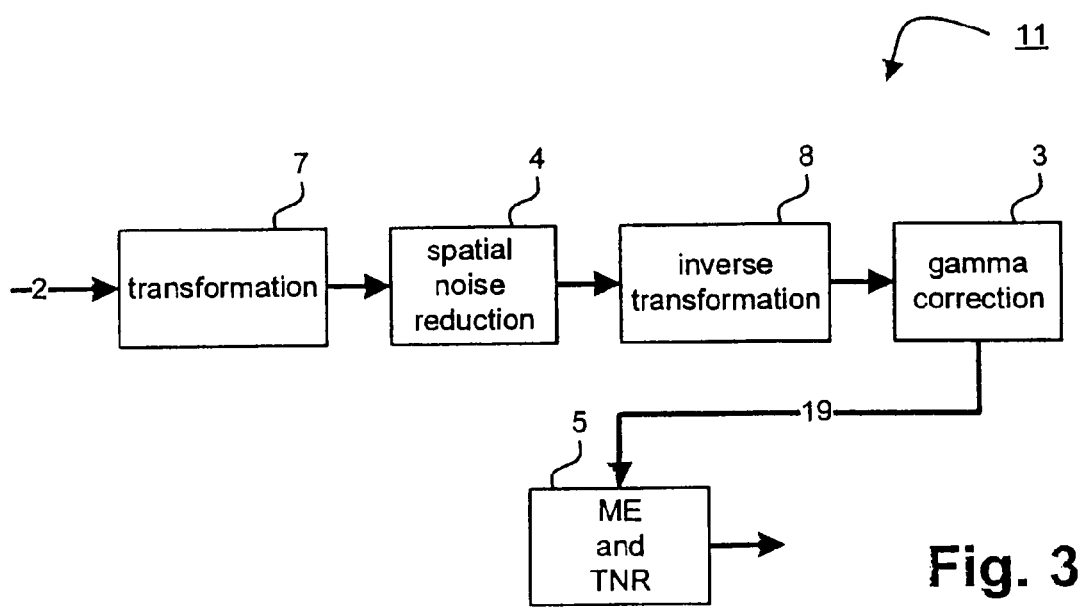
Fig. 3

METHOD AND SYSTEM FOR REDUCING NOISE IN IMAGE DATA

The present invention relates to a method for reducing noise in image data, to a computer program product for performing the steps of the method, to a system for noise reduction in image data and to an imaging device comprising a system for noise reduction.

In the field of acquiring, processing and displaying images several types of distortions influence the quality of the image. Accordingly, several correction methods and processing steps are adopted in order to remove the distortions and enhance the quality of the image. One problem is that images to be displayed or processed by means such as a cathode ray tube CRT monitor, LC displays, televisions, scanners, digital cameras and/or printing systems suffer from noise in the image data, which arises due to the image acquisition (digitisation) and/or transmission.

For example the performance of imaging sensors is affected by a variety of factors and/or images can be corrupted during transmission due to interference in channels used for transmission. Generally, the picture noise is an undesirable visual phenomenon that is caused by the imperfect processes of image capturing, transmission, coding and/or storage.

In order to remove the noise within the images several noise reduction techniques have been adopted. Usually the combination of algorithms and corresponding filters for reducing spatial and temporal noise is adopted.

A further task in image processing is gamma correction. CRT-based displays or LC displays or any other type of displays generally have a non-linear relationship between the applied signal voltage and a resulting image intensity. Gamma correction seeks to compensate for the distortions caused by such non-linearities by pre-distorting the signal in the opposite direction. Therefore, usually from the image data separate colour signals RGB (red, green and blue) are derived and these colour signals are subjected to gamma correction.

With reference to FIG. 1 a system 100 for processing image data according to the prior art will be explained in the following. The raw image data 2 are submitted to a gamma correction component 3 for performing gamma correction on the image data and afterwards the gamma corrected image data are submitted to a spatial noise reduction component 4, which performs a spatial noise reduction on the gamma corrected image data.

The noise reduced image data 6 are submitted either directly to a display or can also be submitted to a further processing component 5, for example a component for performing motion estimation ME and temporal noise reduction TNR.

The problem with the system 100 of the prior art is that the noise reduction is quite difficult. Due to the gamma correction the effect of noise comprised in the raw image data is further deteriorated, which makes the subsequent spatial noise reduction more demanding. This leads to images still having a significant noise and being of reduced quality.

It is therefore an object of the present invention to reduce the disadvantages of the prior art. Specifically, it is an object of the present invention to provide a method and system for an improved noise reduction in image data.

This object is addressed by the features of the independent claims.

Advantageous features and embodiments are the subject-matter of the dependent claims.

Figure 5:
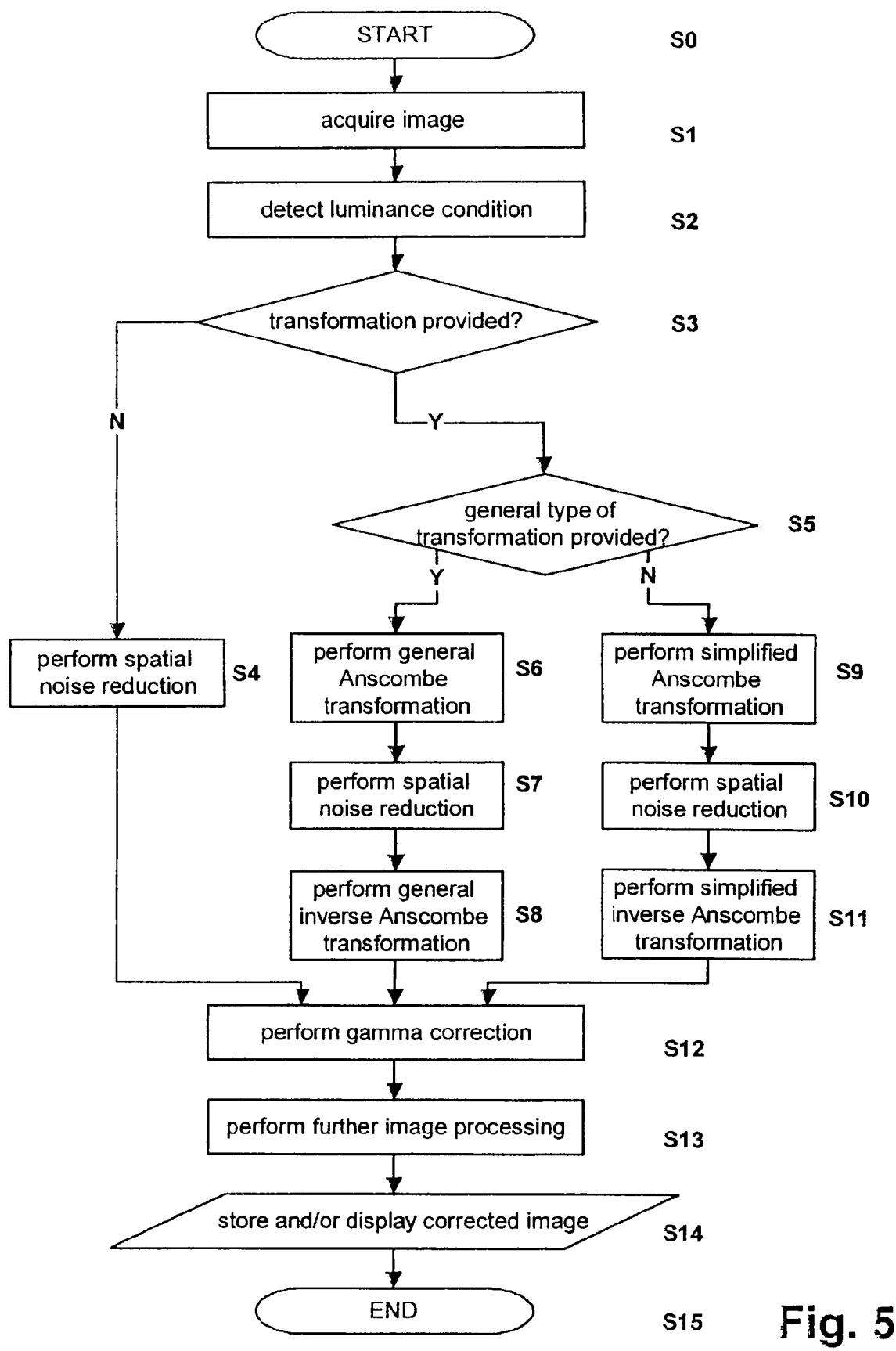

The present invention will now be explained in more detail in the following description of preferred embodiments in relation to the enclosed drawings in which FIG. 1 shows a schematic block diagram of a noise reduction system according to the prior art, FIG. 2 shows a first embodiment of a noise reduction system according to the present invention, FIG. 3 shows a further embodiment of a noise reduction system according to the present invention, FIG. 4 shows a schematic block diagram of an imaging device comprising a noise reduction system according to the present invention, and FIG. 5 shows a flow chart showing the process steps of the method according to the present invention.

One idea underlying the present invention is to provide a specific order of the used processing steps. Specifically, the present invention proposes to first carry out spatial noise reduction and then to apply gamma correction on the noise reduces image data.

In prior art, the effect of gamma correction on the noise comprised in raw image data 2 is often underestimated. Applying the spatial noise reduction after the gamma correction therefore does not suffice to remove all noise in the gamma corrected image data and there remains significant noise, which arises from effects of the gamma correction.

The present invention recognizes this problem and offers an effective and at the same time very simple solution for reducing the problems in prior art by applying the processing steps in different order, i.e. by first performing spatial noise reduction and afterwards performing gamma correction on the already noise reduced data. Even though the present invention adopts the simple solution of changing the processing steps, a quite unexpected significant improvement in image quality is achieved. This allows not only to improve image quality itself but also positively affects all subsequent processing steps such as motion estimation, temporal noise reduction and the like.

FIG. 2 shows a system 1 for noise reduction in image data according to a first embodiment of the present invention. According to this embodiment, the spatial noise reduction step is applied to the raw image data 2 and afterwards a gamma correction is performed on the spatial noise reduced image data.

The raw image data 2 are therefore fed to a spatial noise reduction component 4 for reducing the spatial noise in the image data. Afterwards the spatial noise reduced image data are submitted to the gamma correction component 3, where the gamma correction is performed. The noise reduced image data 9 can then be either directly displayed, submitted to another device, stored for later display or transmission or can be processed by further components, e.g. by a motion estimation and temporal noise reduction component 5 as shown in FIG. 2. It is to be noted that FIG. 2 only shows one possible way of handling the noise reduced image 9. The present invention is not limited to the shown embodiment, but encompasses any other type of handling the noise reduced image data 9 as described above.

In contrast to the prior art, where gamma correction is applied to the image data before a spatial noise reduction, the present invention proposes to first perform spatial noise reduction and then to perform gamma correction. As already addressed, this has the advantage that the spatial noise in the image data has already been removed when the image data is supplied to gamma correction, so that with the gamma correction the spatial noise can not be further deteriorated since it has already been removed from the image data. The resulting noise reduced image data 9 therefore comprise less noise than the prior art noise reduced image data 6 and therefore provide an improved image quality.

A further advantage of the present invention is that if such noise reduced image data 9 are used for a subsequent motion estimation process then a significant improvement in the motion estimation performance is achieved. This improved motion estimation result can then be used for temporal filtering of noise to get optimum noise reduction effects.

The spatial noise reduction component 4 according to the present invention can adopt any present or future component and/or algorithm enabling to reduce spatial noise in image data. Generally, spatial noise reduction aims at a reduction of noise based on data within one image plane. The spatial noise reduction component 4 can for example be implemented as a corresponding linear or non-linear filter, which is known in the state of the art and therefore will not be further discussed. In any case, the present invention adopts any present or future method of spatial noise reduction and is not limited to one type of spatial noise reduction. The spatial noise reduction component 4 can perform spatial noise reduction on the whole image or on image parts.

Likewise, the gamma correction component 3 as used in the present invention can adopt any type of present or future gamma correction applied to any type of image data. The gamma correction component 3 is adapted to apply gamma correction to any cathode ray tube CRT monitor, LC display based on RGB (red green blue) colour space or sRGB (standard red green blue) colour space or any other type of monitor based on any type of colour space.

The first embodiment of the present invention provides a simple and powerful way to reduce noise in image data. Nevertheless, there may be types of raw image data 2, where the proposed first embodiment is not adapted to reduce the noise in a satisfying way.

Depending on the lighting conditions and/or the camera properties present when taking the image or the plurality of images, the known spatial noise reduction in combination with the gamma correction is not sufficient to provide noise reduced image data. Specifically, images taken under low-luminance conditions are affected by different types of noise other than images taken under high-luminance conditions. Depending on the type of noise comprised in the raw image data 2 the known spatial noise reduction method is not sufficient to remove or sufficiently reduce the noise comprised in the raw image data 2.

In this case the present invention proposes a system 11 according to a further embodiment as shown in FIG. 3.

In this system 11 before applying spatial noise reduction the raw image data 2 do first undergo a transformation step performed by a transformation component 7. In this transformation step the raw image data 2 including the noise are transformed by a corresponding algorithm for transforming the type of noise comprised in the raw image data 2. Hereby, preferably an algorithm is selected for transforming the raw image data 2 in such a way, that the transformed image data comprise a type of noise which can be reduced or removed by the subsequent spatial noise reduction component 4 in an optimum way.

After the spatial noise reduction the image data are submitted to an inverse transformation component 8, which performs the inverse transformation on the image data in order to reverse the transformation carried out by the transformation component 7. The image data after the inverse transformation correspond to the raw image data 2 apart from the removed spatial noise.

Any algorithm for transforming and inverse transforming the image data can be used and likewise any spatial noise reduction algorithm can be used. Preferably, the condition has to be fulfilled, that the transformation transforms the noise in the image data in such a way that the noise can be effectively removed during the following spatial noise reduction step. Further, the transformation algorithm and inverse transformation algorithm preferably are selected in such a way, that no information of the original image data is lost. Alternatively, a transformation algorithm can be selected where a small part of image containing little image information is lost.

After the inverse transformation the image data are again submitted to the gamma correction component 3 for performing gamma correction and the noise reduced image data 19 are then either displayed, stored, transmitted or are further processed by further processing components 5, such as for example for motion estimation and temporal noise reduction. It is again to be noted, that the present invention is not limited to systems comprising a further processing component 5 but encompasses any other system comprising a different way of handling the noise reduced image data 19.

In the present invention preferably for the transformation algorithm the Anscombe transformation algorithm is used. Likewise, preferably for the inverse transformation step the inverse Anscombe transformation algorithm is used. It is clear that with the transformation step also the image data itself are transformed but with the inverse transformation step the image data are restored without any loss of information. The different advantages of the Anscombe algorithm and the different types of the Anscombe algorithm that can be used will be explained in the following.

There are generally different types of noise. On one hand there is noise following a Poisson curve, which in the following is referred to as shot or Quantum or Poisson noise. E.g. the arrival of photons and their expression by electron counts on CCD detectors may be modelled by a Poisson distribution. On the other hand there is also noise which follows a Gaussian curve and which in the following is referred to as Gaussian noise, e.g. read-out noise. With the spatial noise reduction according to prior art only Gaussian noise can be reduced. Images which are affected by a mixture of Gaussian and Poisson noise or which are mainly affected by Poisson noise can not be corrected in a satisfying way. Especially images taken with high ISO settings, e.g. ISO 6400 and ISO 12800, and images taken under low-luminance conditions, e.g. images taken under 50 LUX or less, are severely affected by Poisson noise. With the known spatial noise reduction methods only Gaussian noise is handled and Poisson noise is not removed by this process.

In the present invention by performing spatial noise reduction in combination with the Anscombe transformation it is possible to not only suppress, i.e. reduce, Gaussian noise but also Poisson noise. Generally, with the Anscombe transformation the image data comprising the noise are transformed and the Poisson noise comprised in the image data is transformed into Gaussian noise. I.e. if the noise in the image data is of the Poisson type, then the Anscombe transformation acts as if the noise data arose from a Gaussian white noise model.

If the noise in the raw image data 2 is mainly Poisson noise, then the simplified Anscombe transformation can be used. The simplified Anscombe transformation $AT_S$ can be expressed by the following equation:

$$AT_S\{I(x, y)\} = 2\sqrt{I\left(x, y + \frac{3}{8}\right)},$$

where I (x, y) are the raw image data.

With this transformation the whole raw image data 2 are transformed and additionally the Poisson noise is transformed into Gaussian noise. The Gaussian noise can then afterwards be handled by the known spatial noise reduction methods and after the spatial noise reduction step the simplified inverse Anscombe transformation $IAT_S$ is performed on the spatial noise reduced image data according to the following equation:

$$IAT_S\{J(x, y)\} = \left(\frac{J(x, y)}{2}\right)^2 - \frac{3}{8},$$

where J (x, y) represents the spatial noise reduced image data. Thereby the spatial noise is effectively reduced and an optimum image quality can be achieved. When using the simplified Anscombe transformation the processing capacities needed for processing the image are reduced so that this embodiment can also be implemented in devices having small processing capacities.

In another case, where there is a mixture of Poisson and Gaussian noise in the image data, the general Anscombe transformation can be adopted transforming the mixture of Gaussian and Poisson noise into Gaussian noise. Here, the signal's value I (x, a) is considered as a sum of a Gaussian variable γ, of mean g and standard-deviation σ; and a Poisson variable n of mean $m_0$. It is set I(x, y)=γ+αn, where α is the gain. The general Anscombe transformation $AT_G$ then can be expressed with the following equation:

$$AT_G\{I(x, y)\} = \frac{2}{\alpha}\sqrt{\alpha I(x, y) + \frac{3}{8}\alpha^2 + \sigma^2 - \alpha g},$$

Consequently, the inverse general Anscombe transformation $IAT_G$ can be expressed by the following equation:

$$IAT_G\{J(x, y)\} = \left(\frac{J(x, y)}{2}\right)^2 \alpha - \frac{3}{8}\alpha - \frac{\sigma^2}{\alpha} + g$$

To summarize, the present invention proposes different embodiments for reducing noise in image data: In one embodiment the spatial noise reduction and afterwards the gamma correction is performed. In a further embodiment, a transformation step before the spatial noise reduction and a reverse transformation step after the spatial noise reduction is provided. In further embodiments, for the transformation either the simplified or the general Anscombe transformation is used and correspondingly, for the inverse transformation either the simplified or the general inverse Anscombe transformation is used. In any device performing noise reduction, either one embodiment or more embodiments can be implemented.

If only one embodiment is implemented in a device, then this embodiment in any case performs first spatial noise correction and afterwards gamma correction, so that a significant improvement with respect to prior art can be achieved. The selection of only one single embodiment to be implemented can be motivated by the need to fit limited processing capacities and/or storage capacities. Alternatively, there may arise the situation that one device is expected to handle only image data comprising a specific type of noise, so that the corresponding embodiment, which is best adapted to deal with that kind of noise can be selected.

Otherwise, it is possible to implement two or more embodiments of the present invention in one device. Then there can be provided a mechanism for selecting for every image or sequence of images the one embodiment which fits the type of noise in the image data best. The mechanisms for determining which kind of embodiment to use will be explained later on. Additionally or alternatively means can be provided enabling the user to select one of the embodiments.

With reference to FIG. 4 now an imaging device 20 comprising one or more embodiments of the inventive system 1, 11 will be explained in detail. The imaging device can be any kind of device enabling acquisition of image data and processing the image data. Preferably, the imaging device is a camera for still images and/or video sequences, a mobile phone, a PDA, a PC, a television, a notebook or any other kind of device.

The imaging device 20 comprises an image acquisition unit 22 for acquiring the raw image data 2. The image data according to the present invention hereby can be a single image or a sequence of image, i.e. can be a still image or a video stream. The image acquisition unit 22 therefore can comprise a CCD sensor for taking images or any other present or future mechanism adapted to take images of objects externally to the imaging device 20. The image acquisition unit 22 can be a connection to any type of source, e.g. a storage, an internet connection, broadcast transmission, or any other wireless or wired connection for receiving images.

The imaging device further comprises a display 24, which can for example be a CRT monitor or a LC display or any other type of display adapted to display the image data. The imaging device 20 further comprises a memory 25, which can comprise one or more parts of volatile and/or non-volatile storages.

Optionally, the imaging device 20 comprises a detection unit 21 which is adapted to detect conditions indicative of the type of noise comprised in the image raw data 2. The detection unit 21 can for example detect the present luminance conditions, i.e. the luminance conditions when the image is taken. Alternatively or additionally the detection unit 21 can detect the exposure value and the film speed. The detection unit 21 can for example be a sensor for detecting the present lightning or luminance conditions. Depending on the detected luminance condition by the detection unit 21 it will be decided according to predefined parameters which type of noise reduction processing to use. In the memory can for example be stored a table comprising several luminance values and correspondingly several types of processing steps which should be used for correcting the raw image data 2. Generally, the luminance of the camera is measured in terms of LUX. Images captured under 50 LUX or less are classified as taken under low luminance conditions. Nevertheless, depending on the type of camera the value of LUX indicating low luminance conditions may vary and the present invention for detecting low luminance conditions is not limited to the value of 50 LUX.

Alternatively, the detection unit 21 can also be omitted and either only one embodiment can be implemented in the imaging device 20 or a user is able to select on his own a processing method either with a corresponding switch or via any other type of input device (not shown in the figure).

The image acquisition unit 22, the detection unit 21, the display 24 and the memory 25 are all connected to and in data communication with the processing unit 23 which controls the processing in the imaging device 20, i.e. the reading, writing, storing, transmitting, deleting or any other type of data processing within the imaging device 20.

The spatial noise reduction component 4, the gamma correction component 3 and, if present, the transformation component 7 and the inverse transformation component 8 are comprised in the processing unit 23 either as steps performed by a software or can be implemented as hardware components. Likewise, any further processing components 5 for example for motion estimation and temporal noise reduction can also be implemented either as software or hardware in the processing unit 23.

The detailed steps carried out according to the method of the present invention will now be explained with reference to FIG. 5. The process starts in step S0.

In the next step S1 an image is acquired. As previously explained, the image can be a single still image or a sequence of several images constituting a video sequence. The acquisition of the image can be accomplished by taking an image for example by use of a CCD sensor or by receiving the image over any type of transmission channel or by any other way of acquiring an image.

In the next step S2 the detection unit 21 will detect the luminance condition or other parameters indicative of the type of noise in the present acquired image.

In the following step S3 it is decided whether a transformation is provided. In the step S3 based on the detected luminance conditions or other parameters it is decided whether the noise reduction is performed with corresponding transformation and inverse transformation or without the transformation step. If it is decided that the transformation is not provided then in the next step S4 the spatial noise reduction is performed.

Otherwise, if in step S3 it is decided that a transformation is provided and in case that for the transformation the Anscombe transformation is provided, then in the next step S5 it is decided whether a general type of Anscombe transformation is provided or whether a simplified type of Anscombe transformation is provided. In case that there is the possibility to select between the different types of transformation, then in this step S5 it is decided whether the general type of transformation is provided as has been explained above. If it is decided that the general type of transformation is provided then in the next step S6 a general Anscombe transformation is performed on the image data, in the following step S7 the spatial noise reduction is performed and in the next step S8 the general inverse Anscombe transformation is performed.

Otherwise, if in step S5 it is decided that the general type of transformation is not provided, then in the next step S9 a simplified Anscombe transformation is performed, in the following step S10 the spatial noise reduction is performed and in the next step S11 the simplified inverse Anscombe transformation is performed.

As has already been explained the step S2 and the detection unit 21 can also be omitted and the user is enabled to select which process to use. There is also the possibility, that only two different processes are implemented in the device, so that S3 or S5 can be omitted. In a further alternative only one single embodiment can be implemented in the imaging device 20. In this case the whole steps S2, S3 and S5 and the detection unit 21 can be omitted.

In any case after the spatial noise reduction either with transformation step or without transformation step the process continues with step S12, where a gamma correction is performed on the spatial noise reduced image data.

In step S13 optionally further image processing can be accomplished, e.g. for example motion estimation and temporal noise reduction. In the following step S14 the noise reduced image data are stored and/or displayed and/or transmitted to any other device. The process ends in step S15.

Apart from the possibility to enable the user to select one of the embodiments, the present invention adopts a robust and fully automatic method and system enabling noise reduction. Specifically, in any case no manual tuning of parameters is required.

The present invention already with the first embodiment where the spatial noise reduction is performed before the gamma correction provides a method and system for effectively reducing noise in image data. Additionally, in the case of specific luminance condition, and more generally speaking, of different types of noise in the raw image data, the present invention adopts different mechanisms in order to handle different types of noise which again results in an improved noise reduction and thereby in an enhanced image quality. The present invention is suited for all noise level images and provides a more effective noise reduction. In case the present invention is used as pre-processing for motion estimation it outperforms conventional systems in terms of motion vectors accuracy.

The invention claimed is:

1. A method for reducing noise in image data, comprising the steps of:
   (a) detecting a parameter indicative of a type of noise in the image data; and
   (b) deciding, based on the detected parameter, whether to perform a transformation on the image data before performing spatial noise reduction for transforming the type of noise in the image data, wherein
   if it is decided in step (b) to perform the transformation,
   (c) performing the transformation on the image data before performing the spatial noise reduction for transforming the type of noise in the image data,
   (d) performing the spatial noise reduction on the image,
   (e) performing an inverse transformation on the spatial noise reduced image data before applying gamma correction, and
   (f) applying a gamma correction on the spatial noise reduced image data, and
   if it is decided in step (b) not to perform the transformation, performing steps (d) and (f) without performing steps (c) and (e).

2. The method according to claim 1, wherein
   the transformation includes performing an Anscombe transformation for transforming the noise in the image data into Gaussian noise, and
   the inverse transformation includes performing inverse Anscombe transformation.

3. The method according to claim 2, wherein
   for the Anscombe transformation and the inverses Anscombe transformation a simplified transformation is used enabling transformation of Poisson noise into Gaussian noise.

4. The method according to claim 2, wherein
   for the Anscombe transformation and the inverse Anscombe transformation a general transformation is used enabling transformation of a mixture of Poisson and Gaussian noise into Gaussian noise.

5. The method according to claim 1, wherein
   the parameter indicative of the type of noise includes present luminance conditions.

6. The method according to claim 5, wherein step (b) comprises:
   deciding, based on the present luminance conditions, whether to use a general or a simplified transformation and corresponding inverse transformation.

7. A non-transitory computer-readable medium including computer program instructions, which when executed by a computer, cause the computer to perform the steps of the method according to any one of claims 1 and 2-6.

8. A system for noise reduction in image data comprising:

a detection unit that detects a parameter indicative of a type of noise in the image data; and a processing unit that decides, based on the detected parameter, whether to perform a transformation and corresponding inverse transformation on the image data before performing spatial noise reduction for transforming the type of noise in the image data;

performs the transformation on the image data before performing the spatial noise reduction for transforming the type of noise in the image data;

performs the spatial noise reduction on the image data;

performs an inverse transformation on the spatial noise reduced image data before applying gamma correction; and applies the gamma correction on the spatial noise reduced image data.

9. The system according to claim 8, wherein the detection unit detects present luminance conditions.

10. The system according to claim 9, wherein the processing unit decides depending on the luminance conditions detected by the detection unit whether to perform a general or simplified transformation and corresponding inverse transformation on the image data.

11. An imaging device comprising a system for noise reduction according to any one of claims 8, 9 and 10.

* * * * *